United States Patent
Kalusivalingam et al.

(10) Patent No.: US 8,903,942 B2
(45) Date of Patent: Dec. 2, 2014

(54) METHODS AND APPARATUS FOR FORWARDING-STATE TRANSPORT IN A DISTRIBUTED CONTROL PLANE

(75) Inventors: Vijayabhaskar Annamalai Kalusivalingam, San Jose, CA (US); Jaihari Loganathan, Sunnyvale, CA (US); Ravi Shekhar, Sunnyvale, CA (US); Jeelani Syed, Bangalore (IN); Quaizar Vohra, Santa Clara, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 593 days.

(21) Appl. No.: 12/969,277

(22) Filed: Dec. 15, 2010

(65) Prior Publication Data

US 2012/0158942 A1    Jun. 21, 2012

Related U.S. Application Data

(60) Provisional application No. 61/316,720, filed on Mar. 23, 2010.

(51) Int. Cl.
| | |
|---|---|
| G06F 15/16 | (2006.01) |
| H04L 12/715 | (2013.01) |
| H04L 12/751 | (2013.01) |
| H04L 12/937 | (2013.01) |
| H04L 12/931 | (2013.01) |

(52) U.S. Cl.
CPC ............... H04L 45/02 (2013.01); H04L 45/04 (2013.01); H04L 49/354 (2013.01); H04L 49/253 (2013.01); H04L 49/70 (2013.01)
USPC ......................................... 709/217; 709/245

(58) Field of Classification Search
USPC ....................................................... 709/217
See application file for complete search history.

(56) References Cited

U.S. PATENT DOCUMENTS

| | | | |
|---|---|---|---|
| 7,315,897 B1 | 1/2008 | Hardee et al. | |
| 7,437,469 B2 | 10/2008 | Ellanti et al. | |
| 7,664,123 B2 | 2/2010 | Ashwood Smith et al. | |
| 7,715,382 B2 | 5/2010 | Lakshman et al. | |
| 2004/0054866 A1* | 3/2004 | Blumenau et al. | 711/202 |
| 2010/0306408 A1* | 12/2010 | Greenberg et al. | 709/238 |

OTHER PUBLICATIONS

K. Kompella, et al., "Virtual Private LAN Service (VPLS) Using BGP for Auto-Discovery and Signaling" RFC 4761, IETF, Jan. 2007.

* cited by examiner

*Primary Examiner* — Emmanuel L Moise
*Assistant Examiner* — Mahran Abu Roumi
(74) *Attorney, Agent, or Firm* — Cooley LLP

(57) ABSTRACT

In some embodiments, a system includes a first network control entity, a second network control entity and a third network control entity. The first network control entity and the second network control entity are associated with a first network segment. The third network control entity is associated with a second network segment. The first network control entity is operable to send to the second network control entity an identifier of the first network segment and forwarding-state information associated with a data port at a first network element. The second network control entity is operable to receive the identifier of the first network segment and the forwarding-state information. The second network control entity is operable to send the forwarding-state information to a second network element. The first network control entity does not send the identifier of the first network segment and the forwarding-state information to the third network control entity.

20 Claims, 7 Drawing Sheets

METHODS AND APPARATUS FOR FORWARDING-STATE TRANSPORT IN A DISTRIBUTED CONTROL PLANE

RELATED APPLICATION

This application claims priority to, and the benefit of U.S. Provisional Patent Application Ser. No. 61/316,720, filed on Mar. 23, 2010, and entitled "Methods And Apparatus Related To Distributed Control Plane Switch Management."

BACKGROUND

Some embodiments described herein relate generally to a control plane within a network switch, and, in particular, to transmitting forwarding-state information within a distributed control plane of a switch.

Some known networking systems include a centralized control plane that can manage resources connected to the networking system. For example, the centralized control plane can maintain a database associated with the physical location of the resources (e.g., chassis identifier, chassis shelf identifier). Additionally, the centralized control plane can manage forwarding-state information associated with the resources. Such a centralized control plane, however, can become extremely large and unmanageable when a large number of resources are connected to the networking system.

Other known networking systems include a distributed control plane. Such known distributed control planes can be implemented at various nodes within the networking system. In some known networking systems, forwarding-state information is manually configured at each node implementing a portion of the control plane. Such known networking systems, however, are not suitable for large scale networking systems having a large number of nodes implementing a portion of the control plane. For example, an operator would need to manually enter each update and/or change to the topology of such a networking system at each node implementing a portion of the control plane. This can become cumbersome when frequent updates are made to a large scale networking system.

Accordingly, a need exists for apparatus and methods to efficiently transport and/or share forwarding-state information within a distributed control plane.

SUMMARY OF THE INVENTION

In some embodiments, a system includes a first network control entity, a second network control entity and a third network control entity. The first network control entity and the second network control entity are associated with a first network segment. The third network control entity is associated with a second network segment. The first network control entity is operable to send to the second network control entity an identifier of the first network segment and forwarding-state information associated with a data port at a first network element. The second network control entity is operable to receive the identifier of the first network segment and the forwarding-state information. The second network control entity is operable to send the forwarding-state information to a second network element. The first network control entity does not send the identifier of the first network segment and the forwarding-state information to the third network control entity.

DETAILED DESCRIPTION

Figure 1:
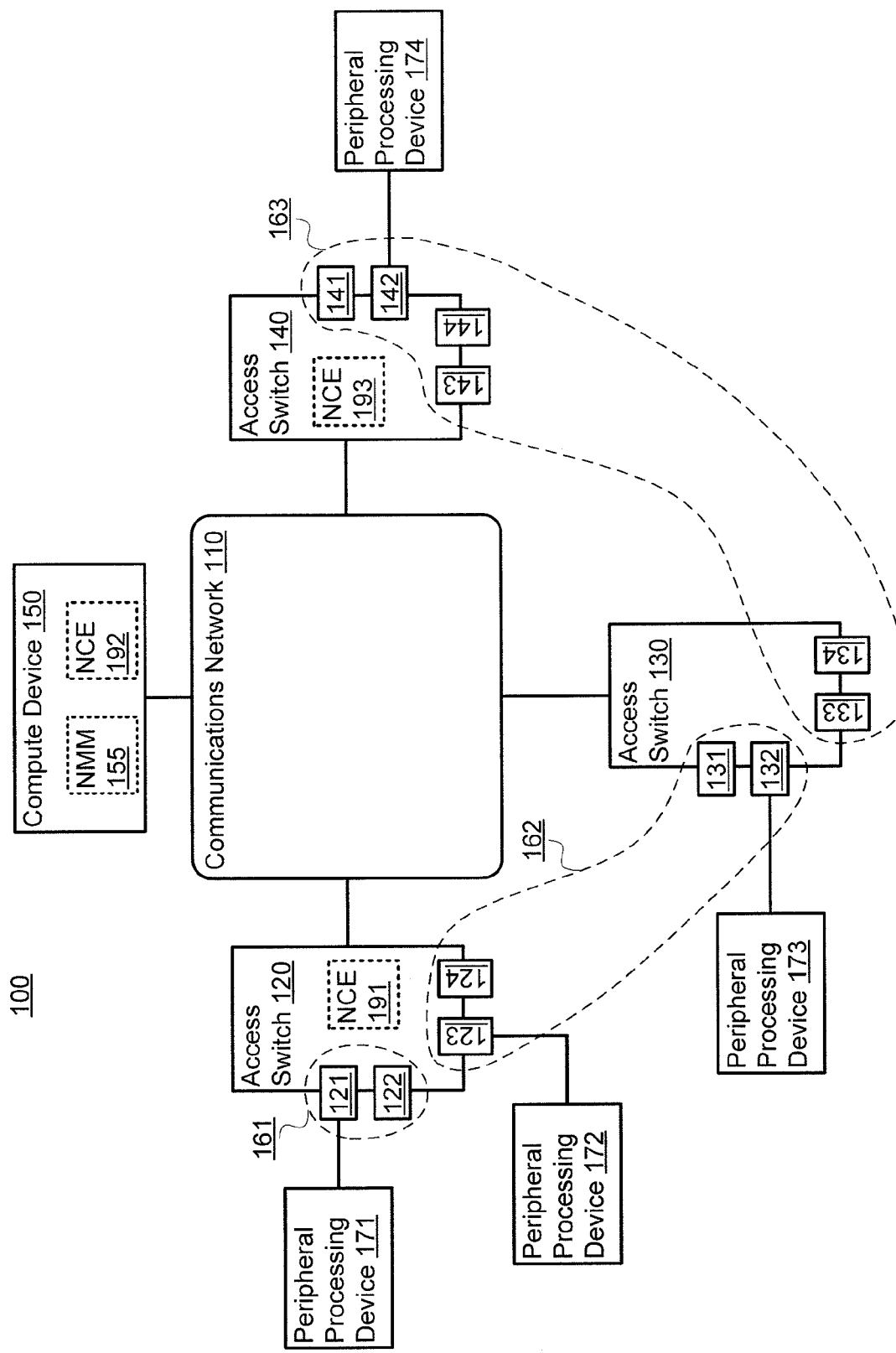
FIG. 1 is a schematic illustration of a switch fabric system, according to an embodiment.

In some embodiments, a system includes a first network control entity, a second network control entity and a third network control entity. The first network control entity is associated with a first network segment including at least a portion of a set of data ports at a first network element operatively coupled to a data plane of a switch fabric. The second network control entity is associated with the first network segment including at least a portion of a set of data ports at a second network element operatively coupled to the data plane of the switch fabric. The third network control entity is associated with a second network segment including at least a portion of the set of data ports at a third network element operatively coupled to the data plane of the switch fabric. The first network control entity is operable to send to the second network control entity an identifier of the first network segment and forwarding-state information associated with a data port from the portion of the set of data ports at the first network element. The second network control entity is operable to receive the identifier of the first network segment and the forwarding-state information and to store the forwarding-state information at a memory associated with the second network control entity. The second network control entity is operable to send a control signal to the second network element in response to the forwarding-state information. The first network control entity is operable to not send the third network control entity the identifier of the first network segment and the forwarding-state information based on the identifier of the first network segment and an identifier of the second network segment.

In such embodiments, forwarding-state information can include port identifiers, network segment identifiers, peripheral processing device identifiers, and/or the like. Such forwarding-state information can be used to send data from a first network element (e.g., a first access switch) to a second network element (e.g., a second access switch). Similarly stated, such forwarding-state information can be used to route and/or forwarding a data packet and/or a data cell through a data plane of the system from a source network element to a destination network element.

Using the identifier of the first network segment, the forwarding-state information associated with a data port of the first network segment remains separated and/or segregated from forwarding-state information associated with a data port of the second network segment. Accordingly, the first network element does not send data to the third network element via the data plane of the system.

In other embodiments, the first network control entity is operable to send the identifier of the first network segment and its forwarding-state information to the third network control entity. In such embodiments, the third network control entity can discard the forwarding-state information of the first network control entity based on the identifier of the first network segment. As such, the forwarding-state information of the first network segment remains separated and/or segregated from the forwarding-state information of the second network segment.

In some embodiments, a system includes a first set of network control entities and a second set of network control entities. Each network control entity from the first set of network control entities is associated with a first network segment of a distributed network switch and is uniquely associated with multiple data ports from a first set of data ports of the distributed network switch. Each network control entity from the second set of network control entities is associated with a second network segment of the distributed network switch and is uniquely associated with multiple data ports from the second set of data ports of the distributed network switch. A network control entity from the first set of network control entities is operable to detect a forwarding state at the multiple data ports from the first set of data ports uniquely associated with the network control entity. A network control entity from the first set of network control entities is operable to send an identifier of the first network segment and information associated with the forwarding state to each remaining network control entity from the first set of network control entities. The network control entity is operable to not send the identifier of the first network segment and the information associated with the forwarding state to the second set of network control entities.

Embodiments shown and described herein are often discussed in reference to multiple layers (e.g., data link layer, network layer, physical layer, application layer, etc.). Such layers can be defined by open systems interconnection (OSI) model. Accordingly, the physical layer can be a lower level layer than the data link layer. Additionally, the data link layer can be a lower level layer than the network layer and the application layer. Further, different protocols can be associated with and/or implemented at different layers within the OSI model. For example, an Ethernet protocol, a Fiber Channel protocol and/or a cell-based protocol (e.g., used within a data plane portion of a communications network) can be associated with and/or implemented at a data link layer, while a Border Gateway Protocol (BGP) can be associated with and/or implemented at a higher layer, such as, for example, an application layer. While BGP can be implemented at the application layer, it can be used, for example, to send forwarding-state information used to populate a routing table associated with a network layer.

As used herein, the term "physical hop" can include a physical link between two modules and/or devices. For example, a communication path operatively coupling a first module with a second module can be said to be a physical hop. Similarly stated, a physical hop can physically link the first module with the second module.

As used herein, the term "single physical hop" can include a direct physical connection between two modules and/or devices in a system. Similarly stated, a single physical hop can include a link via which two modules are coupled without inteiniediate modules. Accordingly, for example, if a first module is coupled to a second module via a single physical hop, the first module can send data packets directly to the second module without sending the data packets through intervening modules.

As used herein, the term "single logical hop" means a physical hop and/or group of physical hops that are a single hop within a network topology associated with a first protocol (e.g., a first data link layer protocol). Similarly stated, according to the network topology associated with the first protocol, no intervening nodes exist between a first module and/or device operatively coupled to a second module and/or device via the physical hop and/or the group of physical hops. A first module and/or device connected to a second module and/or device via a single logical hop can send a data packet to the second module and/or device using a destination address associated with the first protocol and the second module and/or device, regardless of the number of physical hops between the first device and the second device. In some embodiments, for example, a second protocol (e.g., a second data link layer protocol) can use the destination address of the first protocol (e.g., the first data link layer protocol) to route a data packet and/or cell from the first module and/or device to the second module and/or device over the single logical hop. Similarly stated, when a first module and/or device sends data to a second module and/or device via a single logical hop of a first protocol, the first module and/or device treats the single logical hop as if it is sending the data directly to the second module and/or device. In some embodiments, for example, the first protocol can be a packet-based data link layer protocol (i.e., that transmits variable length data packets and/or frames) and the second protocol can be a cell-based data link layer protocol (i.e., that transmits fixed length data cells and/or frames).

In some embodiments, a switch fabric can function as part of a single logical hop (e.g., a single large-scale consolidated layer-2 (L2)/layer-3 (L3) switch). Portions of the switch fabric can be physically distributed across, for example, many chassis and/or modules interconnected by multiple physical hops. In some embodiments, for example, a processing stage of the switch fabric can be included in a first chassis and another processing stage of the switch fabric can be included in a second chassis. Both of the processing stages can logically function as part of a single consolidated switch (e.g., within the same logical hop according to a first protocol) but include a separate single physical hop between respective pairs of processing stages. Similarly stated, each stage within a switch fabric can be connected to adjacent stage(s) by physical links while operating collectively as a single logical hop associated with a protocol used to route data outside the switch fabric. Additionally, packet classification and forwarding associated with a protocol (e.g., Ethernet) used to route data outside a single logical hop need not occur at each stage within the single logical hop. In some embodiments, for example, packet classification and forwarding associated with a first protocol (e.g., Ethernet) can occur prior to a module and/or device sending the data packet to another module and/or device via the single logical hop.

As used in this specification, the singular forms "a," "an" and "the" include plural referents unless the context clearly dictates otherwise. Thus, for example, the term "a module" is intended to mean a single module or a combination of modules.

FIG. 1 is a schematic diagram that illustrates a switch fabric system 100, according to an embodiment. The switch fabric system 100 includes a communications network 110, multiple access switches 120, 130, 140, a compute device 150 and multiple peripheral processing devices 171-174 and can function as a distributed network switch. The peripheral processing devices 171-174 are operatively coupled to each other by remaining portions of the switch fabric system 100. The peripheral processing devices 171-174 can be, for example, compute nodes, service nodes, routers, and storage nodes, as described in further detail herein. In some embodiments, for example, the peripheral processing devices 171-174 include servers, storage devices, gateways, workstations, compute devices and/or the like.

The peripheral processing devices 171-174 can be operatively coupled to one or more ports 121-124, 131-134, 141-144 of the access switches 120, 130, 140 using any suitable connection such as, for example, an optical connection (e.g., an optical cable and optical connectors), an electrical connection (e.g., an electrical cable and electrical connectors) and/or the like. Similarly stated, each port 121-124, 131-134, 141-144 provides a communication interface through which a peripheral processing device 171-174 can be operatively coupled to an access switch 120, 130, 140, as described in further detail herein. As such, the peripheral processing devices 171-174 are configured to send data (e.g., data packets, data cells, etc.) to and receive data from the access switches 120, 130, 140. In some embodiments, each connection between the peripheral processing devices 171-174 and the respective access switches 120, 130, 140 is a direct link. Such a link can be said to be a single physical hop link. In other embodiments, the peripheral processing devices can be operatively coupled to the access switches via intermediate modules. Such a connection can be said to be a multiple physical hop link.

Each access switch 120, 130, 140 can be any device configured to operatively couple peripheral processing devices 171-174 to the communications network 110. In some embodiments, for example, the access switches 120, 130, 140 can be edge devices, input/output modules, top-of-rack devices, network elements and/or the like. Each access switch 120, 130, 140 can be physically located with a chassis of the switch fabric system 100. In some embodiments, for example, each access switch 120, 130, 140 can be located within the same chassis. In other embodiments, each access switch 120, 130, 140 can be located within a different chassis. Structurally, the access switches 120, 130, 140 can function as both source access switches and destination access switches. Accordingly, the access switches 120, 130, 140 can send data (e.g., a data stream of data packets and/or data cells) to and receive data from a data plane portion of the communications network 110, and to and from the respective connected peripheral processing devices 171-174.

Each of the access switches 120, 130, 140 is configured to communicate with the other access switches 120, 130, 140 via a data plane portion of the communications network 110. Specifically, the data plane portion of the communications network 110 is configured to provide any-to-any connectivity between the access switches 120, 130, 140 at relatively low latency. For example, the data plane portion of the communications network 110 can be configured to transmit (e.g., convey) data between access switches 120, 130, 140. In some embodiments, the communications network 110 can have at least hundreds or thousands of ports (e.g., egress ports and/or ingress ports) through which access switches 120, 130, 140 can transmit and/or receive data.

As discussed in further detail herein, the access switches 120, 130, 140 can be configured to host one or more network control entities to manage the ports 121-124, 131-134, 141-144 of the access switches 120, 130, 140. For example, as described in further detail herein, the access switch 120 can host the network control entity 191 to manage the group of ports 161 and the access switch 140 can host the network control entity 193 to manage the group of ports 163. Similarly stated, the network control entity 191 and the network control entity 193 can be processes, applications, virtual machines, and/or some other software module (executing in hardware) or a hardware module that is executed at the access switch 120 and the access switch 140, respectively. As discussed in further detail herein, compute device 150 hosts the network control entity 192 to manage the group of ports 162.

Figure 2:
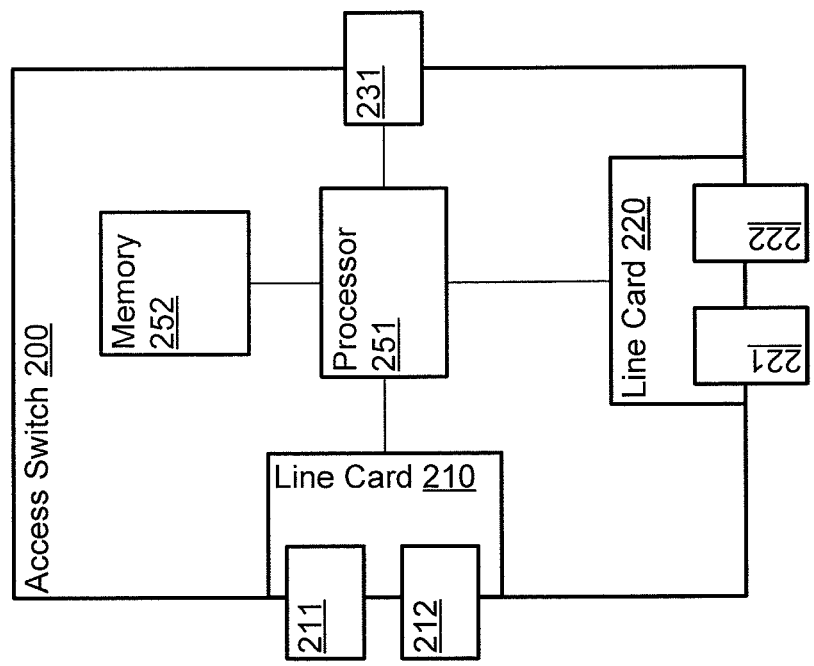
FIG. 2 is a schematic illustration of an access switch of a switch fabric system, according to another embodiment.

FIG. 2 is a system block diagram of an access switch 200 similar to the access switches 120, 130, 140. The access switch 200 includes processor 251, memory 252, line card 210, line card 220, and port 231. Processor 251 is operatively coupled to memory 252, line card 210, line card 220 and port 231. Line card 210 includes ports 211 and 212. Line card 220 includes ports 221 and 222. In some embodiments, line cards 210 and/or 220 include one or more processors and/or memories (not shown).

Similar to the ports 121-124, 131-134, 141-144 of the access switches 120, 130, 140 shown in FIG. 1, ports 211, 212, 221 and 222 can be configured to communicate with peripheral processing devices. For example, ports 211, 212, 221 and 222 can implement a physical layer using twisted-pair electrical signaling via electrical cables or fiber-optic signaling via fiber-optic cables. In some embodiments, some of ports 211, 212, 221 and 222 implement one physical layer such as twisted-pair electrical signaling and others of ports 211, 212, 221 and 222 implement a different physical layer such as fiber-optic signaling. Furthermore, ports 211, 212, 221 and 222 can be configured to allow access switch 200 to communicate with peripheral processing devices, such as, for example, computer servers (servers), via a common protocol such as Ethernet or Fiber Channel. In some embodiments, some of ports 211, 212, 221 and 222 implement one protocol such as Ethernet and others of ports 211, 212, 221 and 222 implement a different protocol such as Fiber Channel. Thus, access switch 200 can be in communication with multiple peripheral processing devices using homogeneous or heterogeneous physical layers and/or protocols via ports 211, 212, 221 and 222.

Port 231 can be configured to be in communication with other access switches via a communications network such as a switch fabric (e.g., communications network 110). Port 231 can be part of one or more network interface devices (e.g., a 40 Gigabit (Gb) Ethernet interface, a 100 Gb Ethernet interface, etc.) through which the access switch 200 can send signals to and/or receive signals from a communications network. The signals can be sent to and/or received from the communications network via an electrical link, an optical link and/or a wireless link operatively coupled to the access switch 200. In some embodiments, the access switch 200 can be configured to send signals to and/or receive signals from the communications network based on one or more protocols (e.g., an Ethernet protocol, a multi-protocol label switching (MPLS) protocol, a Fiber Channel protocol, a Fiber-Channel-over Ethernet protocol, an Infiniband-related protocol).

In some embodiments, port 231 can implement a different physical layer and/or protocol than those implemented at ports 211, 212, 221 and 222. For example, port 211, 212, 221 and 222 can be configured to communicate with peripheral processing devices using a data link layer protocol based on data packets and port 231 can be configured to communicate via a switch fabric using a data link layer protocol based on data cells. Said differently, access switch 200 can be an edge device of a network switch such as a distributed network switch.

In some embodiments, the access switch 200 can be configured to prepare a data packet (e.g., an Ethernet frame and/or packet) to enter a data plane portion of a communications network (e.g., communications network 110). For example, the access switch 200 can be configured to forward, classify, and/or modify the packet encapsulation (e.g., modify, add and/or remove a header portion, footer portion and/or any other identifier included within the data packet) of a data packet prior to sending the data packet to the communications network. Additionally, the access switch 200 can be configured to partition and/or divide the data packet into data cells (e.g., having fixed length payloads) prior to sending the data cells to the switch fabric. Additional details related to packet classification are described in U.S. patent application Ser. No. 12/242,168 entitled "Methods and Apparatus Related to Packet Classification Associated with a Multi-Stage Switch," filed Sep. 30, 2008, and U.S. patent application Ser. No. 12/242,172, entitled "Methods and Apparatus for Packet Classification Based on Policy Vectors," filed Sep. 30, 2008, both of which are incorporated herein by reference in their entireties.

Returning to FIG. 1, the compute device 150 can be configured to host management modules, processes and/or functions associated with the switch fabric system 100. As shown in FIG. 1, and as described in further detail herein, the compute device 150 can be configured to host a network management module 155 and a network control entity 192.

Figure 3:
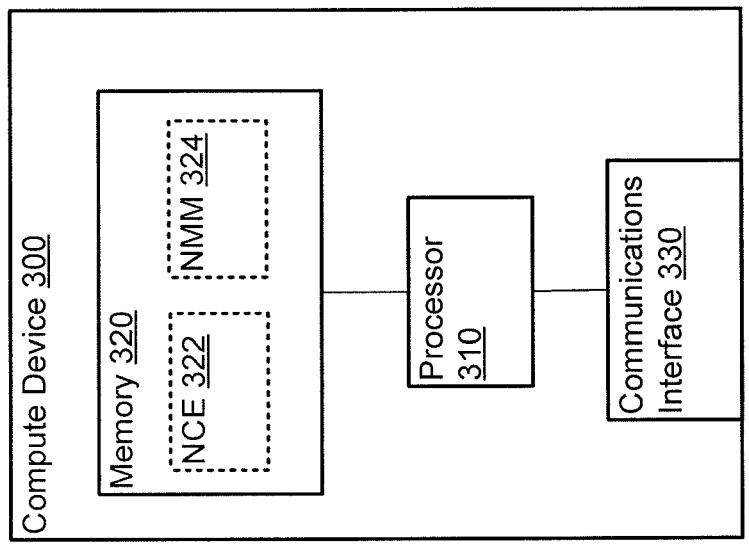
FIG. 3 is a schematic illustration of a compute device of a switch fabric system, according to another embodiment.

FIG. 3 is a system block diagram of a compute device 300 substantially similar to the compute device 150, according to an embodiment. Compute device 300 includes processor 310, memory 320, and communications interface 330. Processor 310 is operatively coupled to memory 320 and communications interface 330. Compute device 300 can communicate with other compute devices, peripheral processing devices and/or access switches via communications interface 330.

As illustrated in FIG. 3, compute device 300 can be configured to host a network control entity 322 and a network management module 324 similar to the network control entity 192 and the network management module 155, respectively. In other words, network control entity 322 and network management module 324 can be processes, applications, virtual machines, and/or some other software module (executing in hardware) or a hardware module that is executed at compute device 300. In some embodiments, for example, instructions that implement network control entity 322 and/or network management module 324 can be stored at memory 320 and executed at processor 310.

In some embodiments, compute device 300 can be dedicated to hosting network control entity 322 and/or network management module 324. In other words, compute device 300 can allocate all or substantially all of its computing resources (e.g., processing capacity and memory) to network control entity 322 and/or network management module 324. In some embodiments, compute device 300 can host other processes, applications, virtual machines, and/or software modules (executing in hardware) in addition to network control entity 322 and/or network management module 324. For example, compute device 300 can be a general purpose compute device or compute node that is configured to host multiple processes, applications, virtual machines, and/or software modules.

Returning to FIG. 1, the network management module 155 can divide and/or partition the ports 121-124, 131-134, 141-144 of the access switches 120, 130, 140 into the groups of ports 161, 162, 163 to be managed by network control entities 191-193. As such, the network management module 155 can be configured to associate the group of ports 161 with the network control entity 191, the group of ports 162 with the network control entity 192 and the group of ports 163 with the network control entity 193. Additionally, as described in further detail herein, the network management module 155 can also monitor an available processing capacity of each network control entity 191-193 and initiate and/or terminate network control entities 191-193 when the available processing capacity of a network control entity 191-193 crosses (e.g., falls below) a first threshold and/or crosses (e.g., exceeds) a second threshold, respectively.

In some embodiments, the network management module 155 can store (e.g., in a memory) a configuration file associated with configuration information (e.g., port protocol information, network segment assignment information, port assignment information, peripheral processing device information, etc.) and/or associated with forwarding-state information (e.g., port identifiers, network segment identifiers, peripheral processing device identifiers, etc.) associated with the switch fabric system 100. The network management module 155 can send a portion of the configuration information and/or forwarding-state information associated with a group of ports 161, 162, 163 managed by a particular network control entity 191-193 to that network control entity 191-193. For example, the network management module 155 can send a portion of the configuration file associated with the group of ports 161 to the network control entity 191.

As discussed above, the access switches 120, 130, 140 and/or the compute device 150 can be configured to host network control entities 191, 192, 193 that manage the ports 121-124, 131-134, 141-144 of the access switches 120, 130, 140. Each network control entity 191-193 can be a process, application, virtual machine, and/or some other software module (executing in hardware) or a hardware module executed at an access switch 120, 130, 140 or a compute device 150. As such, instructions that implement the network control entity 191-193 can be stored within a memory of an access switch 120, 130, 140 (e.g., memory 252) and executed at a processor of an access switch 120, 130, 140 (e.g., processor 251), or stored within a memory of a compute device 150 (e.g., memory 320) and executed at a processor of a compute device 150 (e.g., processor 310).

Each network control entity 191-193 can be configured to manage ports 121-124, 131-134, 141-144 of the access switches 120, 130, 140. For example, network control entity 191 is configured to manage the ports 121, 122 associated with the group of ports 161, network control entity 192 is configured to manage the ports 123, 124, 131, 132 associated with the group of ports 162 and network control entity 193 is configured to manage the ports 133, 134, 141, 142, 143, 144 associated with the group of ports 163. In some embodiments, each network control entity 191-193 can manage and/or maintain forwarding-state information (e.g., port identifiers, network segment identifiers, peripheral processing device identifiers, etc.) associated with its group of ports 161, 162, 163, monitor a state and/or status of peripheral processing devices 171-174 associated with its group of ports 161, 162, 163, and/or manage and maintain other information associated with the peripheral processing devices 171-174 and/or ports 121-124, 131-134, 141-144 associated with its group of ports 161, 162, 163. As described in further detail herein, such forwarding-state information can be used to send data from a first access switch 171-174 to a second access switch 171-174. Similarly stated, such forwarding-state information can be used to route and/or forwarding a data packet and/or cell through a data plane portion of the communications network 110 from a source access switch 171-174 to a destination access switch 171-174.

In some embodiments, a network control entity can control and/or manage ports at an access switch at which the network control entity is located (e.g., network control entity 191 manages the group of ports 161). In other embodiments, a network control entity can also control and/or manage ports at an access switch other than the access switch and/or compute device at which the network control entity is located (e.g., network control entity 192 manages ports 123, 124, 131 and 132). In such embodiments, the network management module 155 has flexibility to assign each port 121-124, 131-134, 141-144 to a network control entity 191-193 based on processing capacity. Additionally, in such embodiments, the network management module 155 is not constrained by the physical location of the network control entities 191-193 and/or the ports 121-124, 131-134, 141-144 when assigning the ports 121-124, 131-134, 141-144 to a network control entity 191-193.

Figure 4:
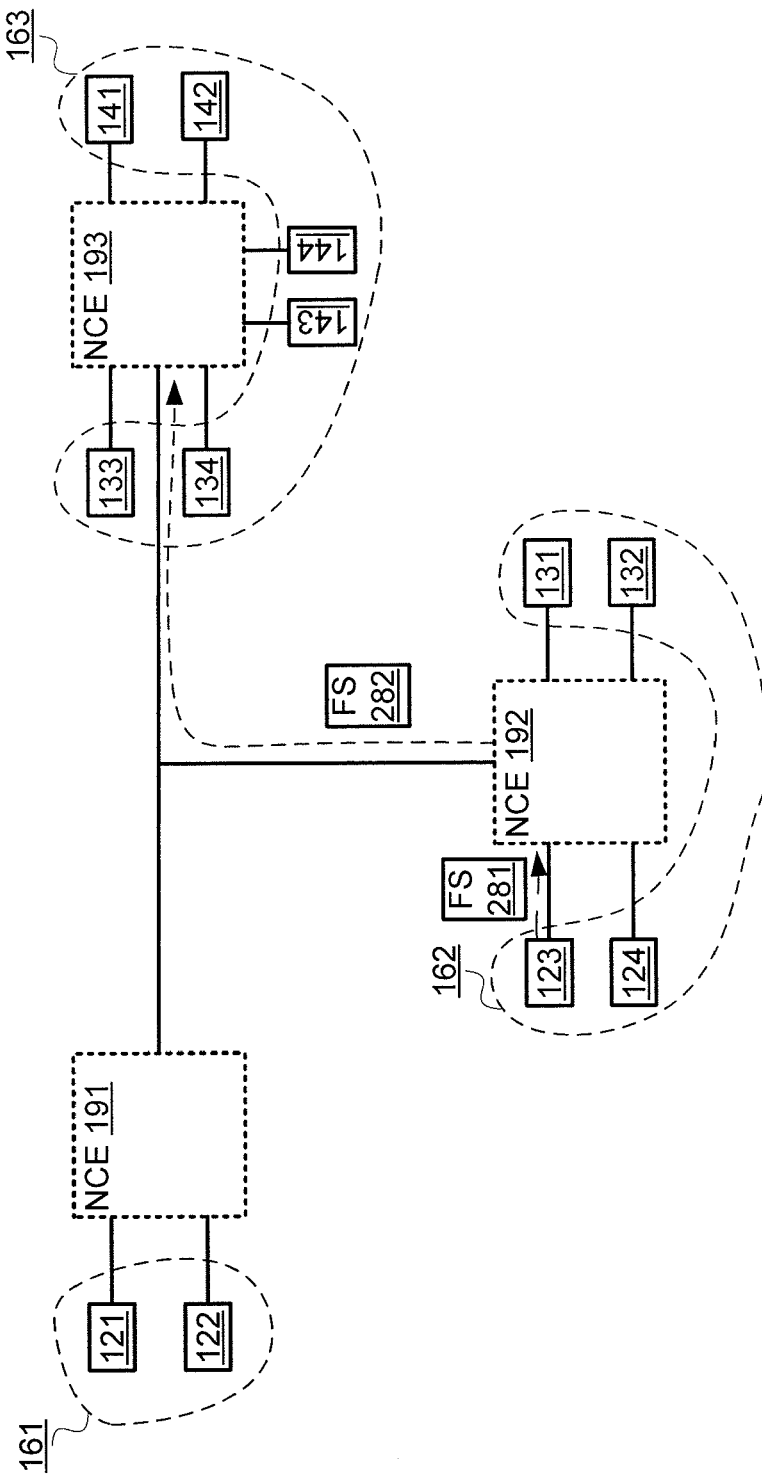
FIG. 4 is a logical representation of a control plane of the switch fabric system of FIG. 1.

FIG. 4, for example, is a block diagram of a logical topology of a control plane of the switch fabric system 100, shown in FIG. 1. The network control entities 191-193 are logically coupled to each other within the control plane. As shown in FIG. 1, and as described in further detail herein, such a connection can be through a control plane portion of the communications network 110. Thus, the network control entities 191-193 can send control information (e.g., forwarding-state information, configuration information, etc.) to each other via the control plane. For example, as described in further detail herein, network control entity 192 can send forwarding-state information associated with the group of ports 162 to the network control entity 193 via the control plane. Accordingly, the network control entities 191-193 can store and/or maintain identifiers and/or address associated with the other network control entities 191-193.

In some embodiments, and as discussed in further detail herein, each network control entity 191-193 can be part of a network segment (e.g., a virtual local area network (VLAN), a virtual switch fabric, etc.). For example, network control entity 192 and network control entity 193 can be part of a first network segment, and network control entity 191 can be part of a second network segment. In such embodiments, each network control entity 191-193 only sends forwarding-state information to the other network control entities within the same network segment. Accordingly, each network control entity 191-193 only stores and/or maintains identifiers and/or addresses associated with the other network control entities 191-193 associated with its network segment. As such, the network control entity 192 sends forwarding-state information to and maintains an identifier and/or address associated with the network control entity 193 but not the network control entity 191. Accordingly, in the above example, the ports 121, 122 associated with the network control entity 191 (associated with the second network segment) do not send data to the ports 123, 124, 131-134, 141-144 associated with the network control entities 192 and 193 (associated with the first network segment).

Returning to FIG. 1, the communications network 110 can be any suitable communications network that operatively couples the access switches 120, 130, 140 to the other access switches 120, 130, 140. Additionally, the communications network can operatively couple the compute device 150 to the access switches 120, 130, 140. In some embodiments, the communications network 110 includes a data plane portion and a control plane portion. The control plane portion of the communications network 110 facilitates transmission of control signals (e.g., containing forwarding-state information and/or configuration information) between the network control entities 191-193 and the network management module 155. Accordingly, the network control entities 191-193 can send forwarding-state information to other network control entities 191-193 via the control plane portion of the communications network 110.

The data plane portion of the communications network 110 facilitates transmission of data between access switches 120, 130, 140. In some embodiments, the data plane portion of the communications network 110 is a switch fabric having one or more stages. For example, the data plane portion of the communications network 110 can be a Clos switch fabric network (e.g., a non-blocking Clos network, a strict sense non-blocking Clos network, a Benes network) having multiple stages of switching modules (e.g., integrated Ethernet switches). Such a switch fabric can include any number of stages. In some embodiments, for example, the switch fabric can include five, seven or nine stages. The data plane portion of the communications network 110 can be, for example, part of a core portion of a data center similar to the core portion of the data center described in co-pending U.S. patent application Ser. No. 12/495,337, filed Jun. 30, 2009, and entitled "Methods and Apparatus Related to Any-to-Any Connectivity Within a Data Center," which is incorporated herein by reference in its entirety.

In some embodiments, the data plane portion of the communications network 110 can be (e.g., can function as) a single consolidated switch (e.g., a single large-scale consolidated L2/L3 switch). In other words, the data plane portion of the communications network 110 can be configured to operate as a single logical entity (e.g., a single logical network element). Similarly stated, the data plane of the communications network 110 can define part of a single logical hop between a first access switch 120, 130, 140 and a second access switch 120, 130, 140 (e.g., along with the data paths between the access switches 120, 130, 140 and the data plane portion of the communications network 110). The data plane portion of the communications network 110 can be configured to couple (e.g., indirectly connect, facilitate communication between) the peripheral processing devices 171-174. In some embodiments, the data plane portion of the communications network 110 can be configured to communicate via interface devices (not shown) that can transmit data at a rate of at least 10 Gb/s. In some embodiments, the data plane portion of the communications network 110 can be configured to communicate via interface devices (e.g., Fiber-Channel interface devices) that can transmit data at a rate of, for example, 2 Gb/s, 4, Gb/s, 8 Gb/s, 10 Gb/s, 40 Gb/s, 100 Gb/s and/or faster link speeds.

Although the data plane portion of the communications network 110 can be logically centralized, the implementation of the data plane portion of the communications network 110 can be highly distributed, for example, for reliability. For example, portions of the data plane portion of the communications network 110 can be physically distributed across, for example, many chassis. In some embodiments, for example, a processing stage of the data plane portion of the communications network 110 can be included in a first chassis and another processing stage of the data plane portion of the communications network 110 can be included in a second chassis. Both of the processing stages can logically function as part of a single consolidated switch (e.g., within the same logical hop) but have a separate single physical hop between respective pairs of processing stages.

In use, the network management module 155, initiates network control entities 191-193 and, based on a processing capacity of the network control entities 191-193, assigns each port 121-124, 131-134, 141-144 to a network control entity 191-193. As shown in FIG. 1, for example, the network management module 155 associates ports 121 and 122 (group of ports 161) with the network control entity 191; ports 123, 124, 131 and 132 (group of ports 162) with the network control entity 192; and ports 141, 142, 143, 144, 133 and 134 (group of ports 163) with the network control entity 193.

The network management module 155 can send different configuration information (e.g., a configuration file) to each network control entity 191-193. In some embodiments, for example, each network control entity 191-193 can receive configuration information (e.g., port protocol information, network segment assignment information, port assignment information, peripheral processing device information, etc.) from the network management module 155 associated with its associated group of ports 161-163. For example, network control entity 191 can receive configuration information associated with the group of ports 161, network control entity 192 can receive configuration information associated with the group of ports 162 and network control entity 193 can receive configuration information associated with the group of ports 163.

In some embodiments, each network control entity 191-193 can monitor and/or manage the group of ports 161-163 with which it is associated. For example, each network control entity 191-193 can detect a change in state associated with its associated group of ports 161-163. In some embodiments, for example, a network control entity 191-193 can detect when a peripheral processing device 171-174 is operatively coupled and/or decoupled from a port 121-124, 131-134, 141-144 from its associated group of ports 161-163. In some embodiments, the network control entities 191-193 can send updated forwarding-state information (e.g., port identifiers, network segment identifiers, peripheral processing device identifiers, etc.) to the other network control entities 191-193 based on a change in state at the network control entity 191-193.

As shown in FIG. 4, for example, the network control entity 192 can detect a change in state at the port 123. For example, after the peripheral processing device 172 (FIG. 1) is initially coupled to the port 123, the peripheral processing device 172 can send forwarding-state information 281 associated with the peripheral processing device 172 to the network control entity 192. In some embodiments, such forwarding-state information 281 can include a peripheral processing device identifier associated with the peripheral processing device 172, such as, for example, a media access control (MAC) address, an internet protocol (IP) address, and/or the like.

The network control entity 192 can update and/or revise its configuration table accordingly. The network control entity 192 can then send updated forwarding-state information 282 to the network control entity 193, as shown in FIG. 4. In some embodiments, such forwarding-state information 282 can include, for example, port identifiers of the ports 123, 124, 131, 132 associated with the network control entity 192, a port identifier associated with the updated port 123, a network segment identifier associated with a network segment with which the network control entity 192 is associated, peripheral processing device identifiers (e.g., MAC address, IP address, etc.) associated with the peripheral processing devices 172, 173 operatively coupled to the group of ports 162, a peripheral processing device identifier associated with the updated peripheral processing device 172 and/or the like.

In some embodiments, the network control entity 192 can send the forwarding-state information 282 to the network control entity 193 using a targeted higher level protocol (e.g., an application layer protocol) such as, for example, Boarder Gateway Protocol (BGP). In such embodiments, the network control entity 192 can use such a higher level protocol in conjunction with any suitable lower level protocol (e.g., a data link layer protocol), such as, for example, Ethernet and/or Fiber Channel, to send the forwarding-state information 282. While BGP can be implemented at the application layer, it can be used to send forwarding-state information used to populate a routing table (e.g., at the network control entity 193) associated with a network layer. Using a targeted protocol, such as BGP, the network control entity 192 can send the forwarding-state information 282 to specific network control entities (e.g., 193) while refraining from sending the forwarding-state information to other network control entities (e.g., 191).

In some embodiments, the network control entity 193 can store the forwarding-state information 282 received from the network control entity 192 in a memory associated with the network control entity 193. For example, the network control entity 193 can store the forwarding-state information 282 at the memory (e.g., memory 252) of the access switch 140 at which the network control entity 193 is located. Similarly stated, the network control entity 193 can update a configuration and/or forwarding-state table within the memory of the access switch 140 in response to receiving the forwarding-state information 282. In some embodiments, the forwarding-state information 282 can be stored at a portion of the memory of the access switch 140 allocated and/or partitioned for the network control entity 193.

The network control entity 193 can then send the updated forwarding-state information 282 to data plane modules (not shown in FIG. 1) at the access switches 130, 140 at which ports 133, 134, 141, 142, 143, 144 associated with the network control entity 193 are located. In some embodiments, for example, the network control entity 193 can store the forwarding-state information 282 at a portion of the memory (e.g., within a routing table) of the access switch 140 allocated and/or partitioned for data, processes and/or applications associated with the data plane. In such embodiments, the memory of the access switch 140 can store the forwarding-state information 282 in a portion of the memory associated with the network control entity 193 as well as in a portion of the memory associated with the data plane. In other embodiments, the forwarding-state information 282 is stored within a single location within the memory of the access switch 140 accessible by the applicable processes at the access switch 140 (including the network control entity 193 and the data plane module). The network control entity 193 also sends the forwarding-state information 282 to a data plane module at the access switch 130 (ports 133 and 134 at access switch 130 are associated with the network control entity 193). Similar to the access switch 140, the access switch 130 can store the forwarding-state information within a memory (e.g., within a routing table).

In some embodiments, and as described in further detail herein, the network control entity 191 can be part of a different network segment than the network control entities 192 and 193. In such embodiments, the network control entity 192 can send forwarding-state information 282 to the network control entities (e.g., 193) associated with the same network segment while refraining from sending the forwarding-state information to the network control entities (e.g., 191) associated with another network segment. In such a manner, multiple network segments (e.g., virtual switch fabric systems) can be defined within the switch fabric system 100. In other embodiments, the network control entity 192 also sends the updated forwarding-state information 282 to the network control entity 191, but the network control entity 191 ignores the received forwarding-state information.

A data packet (e.g., an Ethernet packet and/or frame, a Fiber Channel packet and/or frame, etc.) can be sent between peripheral processing devices 171-174 using the switch fabric system 100. For example, a data packet can be sent from a source peripheral processing device 174 to a destination peripheral processing device 172. The source peripheral processing device 174 can send the data packet to the access switch 140 through port 142 using a first lower level protocol (e.g., Ethernet, Fiber Channel, etc.).

Based on the forwarding-state information received from the network control entity 193 and stored in a memory (e.g., within a routing table), the access switch 140 can prepare the data packet to enter the data plane portion of the communications network 110. In some embodiments, for example, based on the forwarding-state information, the access switch 140 can add and/or append a header to the data packet having a destination address of the peripheral processing device 172 and/or the port 123. In some embodiments, the access switch 140 can also divide and/or partition the data packet into multiple data cells (e.g., having fixed length payloads) to be sent through the data plane portion of the communications network 110 to the access switch 120.

The data packet and/or cells is/are sent to the access switch 120 through the data plane portion of the communications network 110. The data plane portion of the communications network 110 can route and/or forward the data packet and/or cells based the destination address of the peripheral processing device 172 and/or the port 123. As such, the data plane portion of the communications network 110 can use a second lower level protocol (e.g., a cell based protocol), different than the first lower level protocol (e.g., Ethernet, Fiber Channel, etc.) used to send the data packet from the peripheral processing device 174 to the access switch 140. Accordingly, while the data packet can transverse multiple physical hops when in the data plane portion of the communications network 110, the path between the access switch 140 and the access switch 120 can be a single logical hop from the perspective of the first lower level protocol.

The access switch 120 can receive the data packet and/or cells and prepare the data packet and/or cells to be sent to the peripheral processing device 172 via the port 123. Such preparation can include removing a header having the destination address of the peripheral processing device 172 and/or the port 123 from the data packet and/or cells (i.e., the header appended to the data packet by the access switch 140 and used by the data plane portion of the communications network 110 to route and/or forward the data). In some embodiments, such preparation can also include reconstructing and/or reassembling the data packet from the data cells. More generally, the access switch 120 can prepare the data packet to be sent to the peripheral processing device 172 using the first lower level protocol (e.g., Ethernet, Fiber Channel, etc.). After the data packet is ready, the access switch 120 sends the data packet to the peripheral processing device 172.

Figure 5:
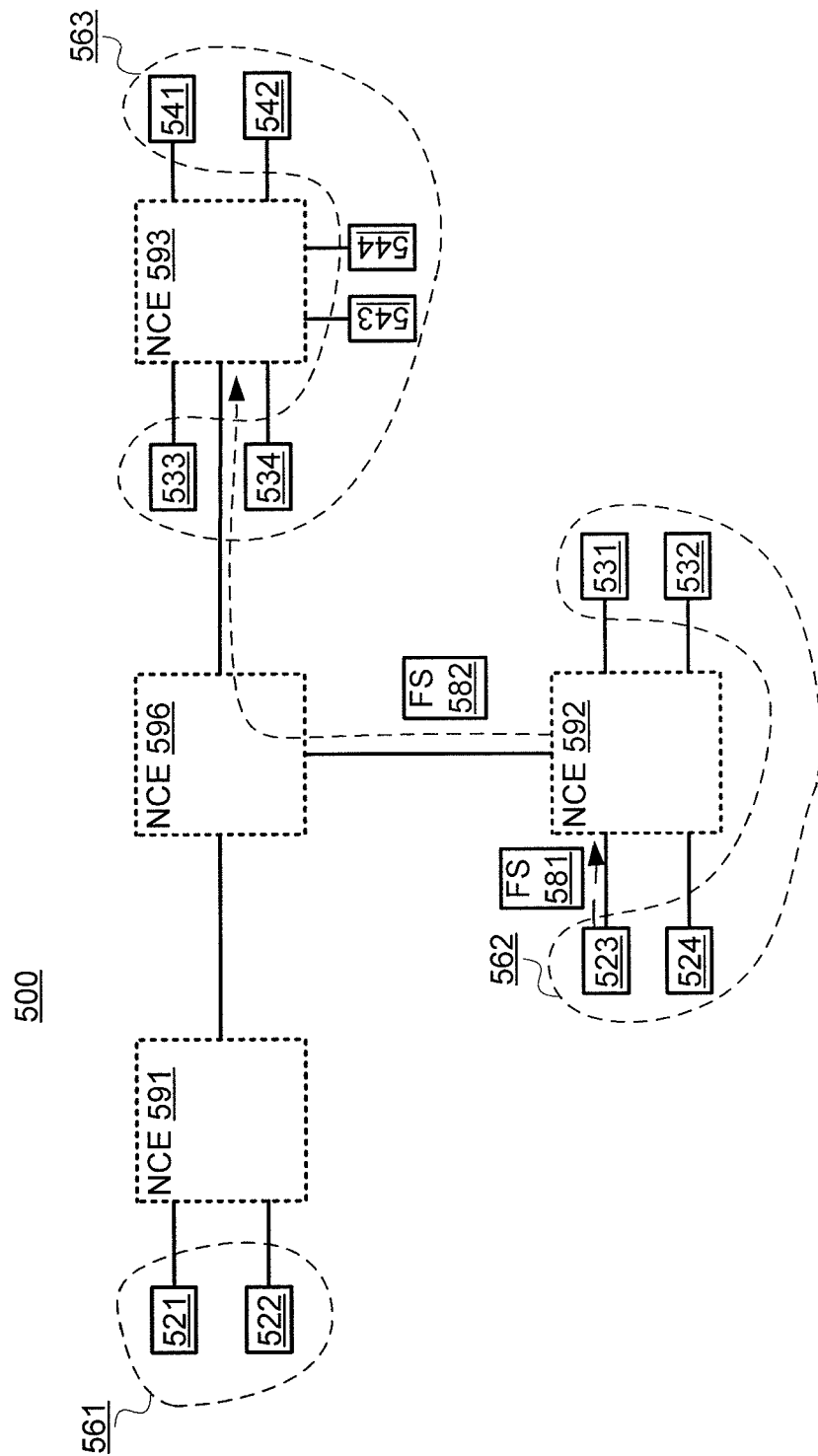
FIGS. 5 and 6 are logical representations of a control plane of a switch fabric system, according to other embodiments.

In some embodiments, a network management module can initiate one or more network control entities to function as BGP route reflectors. FIG. 5, for example, is a logical representation of a control plane 500 of a switch fabric system having a network control entity 596 functioning as a route reflector. Similarly stated, the network control entity 596 can function as an intermediary network control entity between the network control entities 591-593.

As shown in FIG. 5, the control plane 500 includes network control entities 591, 592, 593 and 596. Similar to the network control entities 191-193, the network control entities 591, 592, 593, 596 can be located at and/or hosted by an access switch and/or a compute device similar to the access switch 200 of FIG. 2 and/or the compute device 300 of FIG. 3, respectively. The network control entities 591-593 can be functionally similar to the network control entities 191-193. As such, each network control entity 591-593 can be configured to manage a group of ports 561-563. As shown in FIG. 5, for example, network control entity 591 can manage group of ports 561 (including ports 521 and 522), network control entity 592 can manage group of ports 562 (including ports 523, 524, 531 and 532), and network control entity 593 can manage group of ports 563 (including ports 533, 534, 541, 542, 543 and 544).

Each network control entity 591-593 is operatively coupled to the other network control entities 591-593 via the network control entity 596. As such, each network control entity 591-593 can send and receive signals from the other network control entities 591-593 through network control entity 596. For example, the network control entity 592 can receive forwarding-state information 581 from a peripheral processing device (not shown in FIG. 5) operatively coupled to port 523. Based on the forwarding-state information 581, the network control entity 592 can send forwarding-state information 582 (e.g., port identifiers, network segment identifiers, peripheral processing device identifiers, etc.) to the network control entity 593 via the network control entity 596 using a targeted protocol such as BGP.

In some embodiments, the network control entity 592 does not store an address and/or identifier associated with the network control entity 593. In such embodiments, the network control entity 592 stores an address and/or identifier associated with the network control entity 596 but not addresses and/or identifiers associated with the other network control entities 591 and 593. As such, the network control entity 592 can send updated forwarding-state information 582 to the network control entity 596. Similarly stated, the network control entity 592 can address the updated forwarding-state information 582 to be sent to the network control entity 593 to the network control entity 596. The network control entity 596 can determine to which network control entities 593 the forwarding-state information 582 should be sent, and sends the forwarding-state information 582 accordingly. In such embodiments, the address and/or identifier associated with the network control entity 593 is stored at the network control entity 596. Accordingly, having the network control entity 596 allows the network control entity 592 to store an address and/or identifier of a route reflector (e.g., that of network control entity 596) but not other network control entities 591 and 593.

In some embodiments, the network control entity 596 only sends the forwarding-state information 582 to network control entities associated with a particular network segment (e.g., a virtual network and/or a virtual switch fabric). For example, the network control entity 592 and the network control entity 593 can be associated with a first network segment and the network control entity 591 can be associated with a second network segment. The forwarding-state information 582 can include and/or be sent with an identifier associated with the first network segment. When the network control entity 596 receives the forwarding-state information 582, the network control entity 596 can, based on the identifier associated with the first network segment, send the forwarding-state information 582 to the other network control entities 593 associated with the first network segment. Additionally, the network control entity 596 can refrain from sending the forwarding-state information 582 to the network control entities 591 associated with the second network segment. As such, the forwarding-state information associated with the first network segment can remain separated and/or segregated from the forwarding-state information associated with the second network segment.

Figure 6:
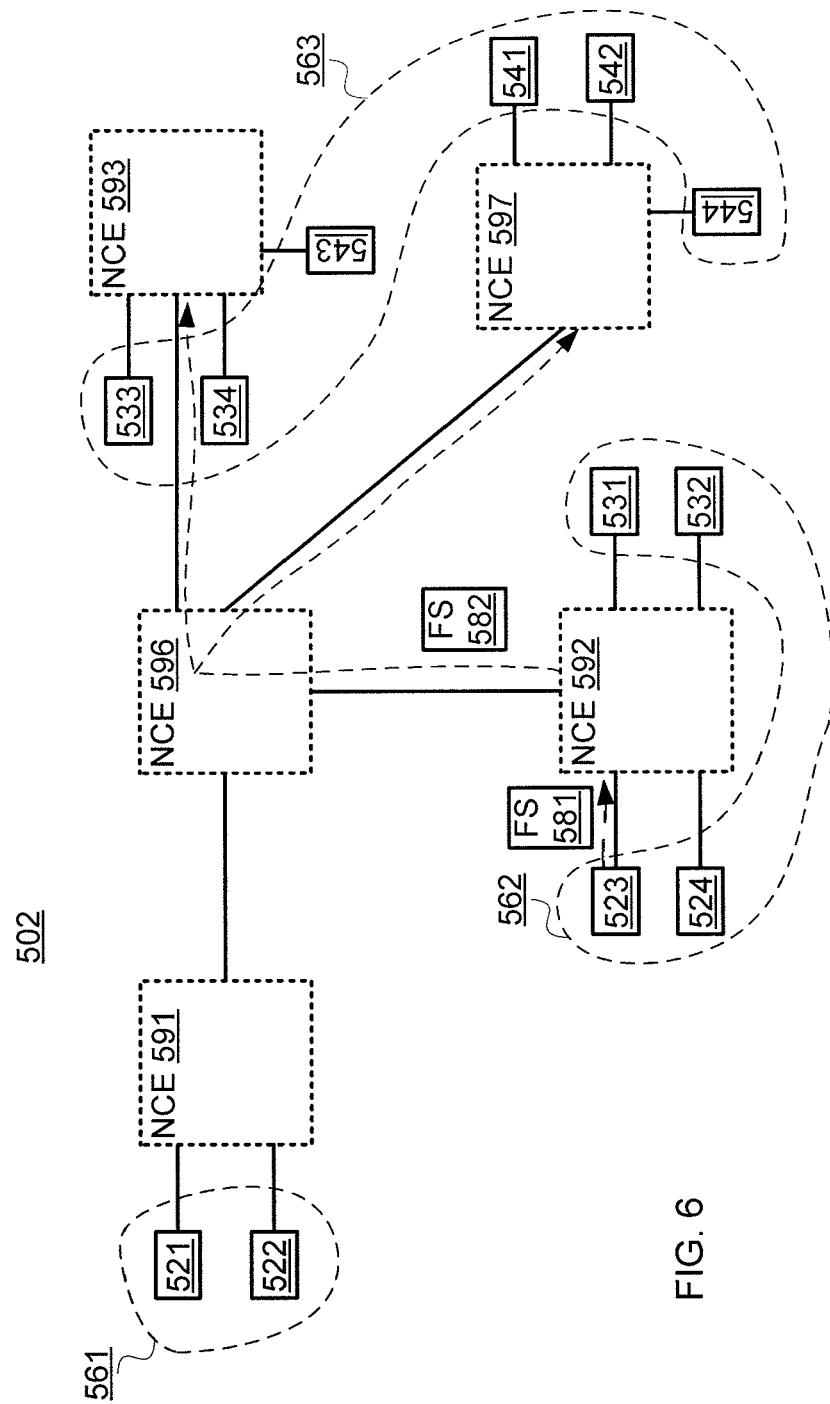

In some embodiments, a network management module can initiate and/or terminate one or more additional network control entities based on available processing capacity of the current network control entities within the switch fabric system and/or within a given network segment. For example, if an available capacity of a first network control entity crosses (e.g., falls below) a first threshold, the network management module can initiate a second network control entity to manage some of the ports associated with the first network control entity. FIG. 6, for example, illustrates a control plane 502 of a switch fabric system. The control plane 502 of the switch fabric system is substantially similar to the control plane 500 shown and described with respect to FIG. 5 except the control plane 502 includes network control entity 597.

Network control entity 597 can be substantially similar to the network control entities 591-593. As such, the network control entity 597 can be located at and/or hosted by an access switch and/or a compute device. As shown in FIG. 6, the network control entity 597, along with the network control entity 593, manages the group of ports 563. Specifically, the network control entity 597 manages the ports 541, 542 and 544 while the network control entity 593 manages the ports 533, 534 and 543.

As shown in FIG. 5, the network control entity can send forwarding-state information to the network control entity 593 and the network control entity 597 via the network control entity 596. As discussed above, the network control entity 592 can send the forwarding-state information to the network control entity 596. Similarly stated, the network control entity 592 can address the updated forwarding-state information 582 to be sent to the network control entity 593 and the network control entity 597 to the network control entity 596. The network control entity 596 can then, determine to which network control entities 593, 597 to send the forwarding-state information, and send the forwarding-state information accordingly. In some embodiments, as described above, the network control entity 596 sends the forwarding-state information to the network control entities 593, 597 associated with a particular network segment. In some embodiments, for example, the forwarding-state information 582 can include an identifier associated with the appropriate network segment, which the network control entity 596 can use to send the forwarding-state information.

The control plane 500 (FIG. 5) can change to the control plane 502 (FIG. 6) when the network management module (not shown in FIGS. 5 and 6) initiates the network control entity 597. As discussed above, this can occur when the available processing capacity of the network control element 593 cross a threshold. Similarly stated, the control plane 500 can change to the control plane 502 when network control entity 593 no longer has the available resources to manage all the ports 533, 534, 541, 542, 543, 544 in the group of ports 563. In some embodiments, the network management module can monitor the activity of network control entity 593 and, when the available capacity of network control entity 593 cross (e.g., falls below) the threshold, the network management module can initiate network control entity 597. The network management module can then assign and/or associate the ports 541, 542, 544 with network control entity 597. The network management module can then disassociate the ports 541, 542, 544 from network control entity 593.

Similarly, the control plane 502 can change to the control plane 500 when an available processing capacity of network control entity 593 and/or network control entity 597 crosses (e.g., rises above and/or exceeds) a threshold. Similarly stated, the control plane 502 can change to the control plane 500 when network control entity 593 and/or network control entity 597 has an amount of available and/or unused resources and/or processing capacity. In some embodiments, the network management module can monitor the activity of network control entity 593 and/or network control entity 597 and, when the available capacity of network control entity 593 and/or network control entity 597 crosses the threshold, the network management module can combine and/or merge network control entity 593 and network control entity 597. For example, if a combined capacity of network control entity 593 and network control entity 597 crosses the threshold, the network management module can terminate, deallocate and/or inactivate network control entity 597. The network management module can then assign and/or associate each port from the group of ports 563 with network control entity 593.

As such, the switch fabric system can expand and/or contract based on the processing requirements of the switch fabric system. Such expansion and contraction is further described in detail in co-pending U.S. patent application Ser. No. 12/968,848, entitled "Methods and Apparatus for Dynamic Resource Management within a Distributed Control Plane of a Switch," filed on Dec. 15, 2010, which is incorporated herein by reference in its entirety.

Figure 7:
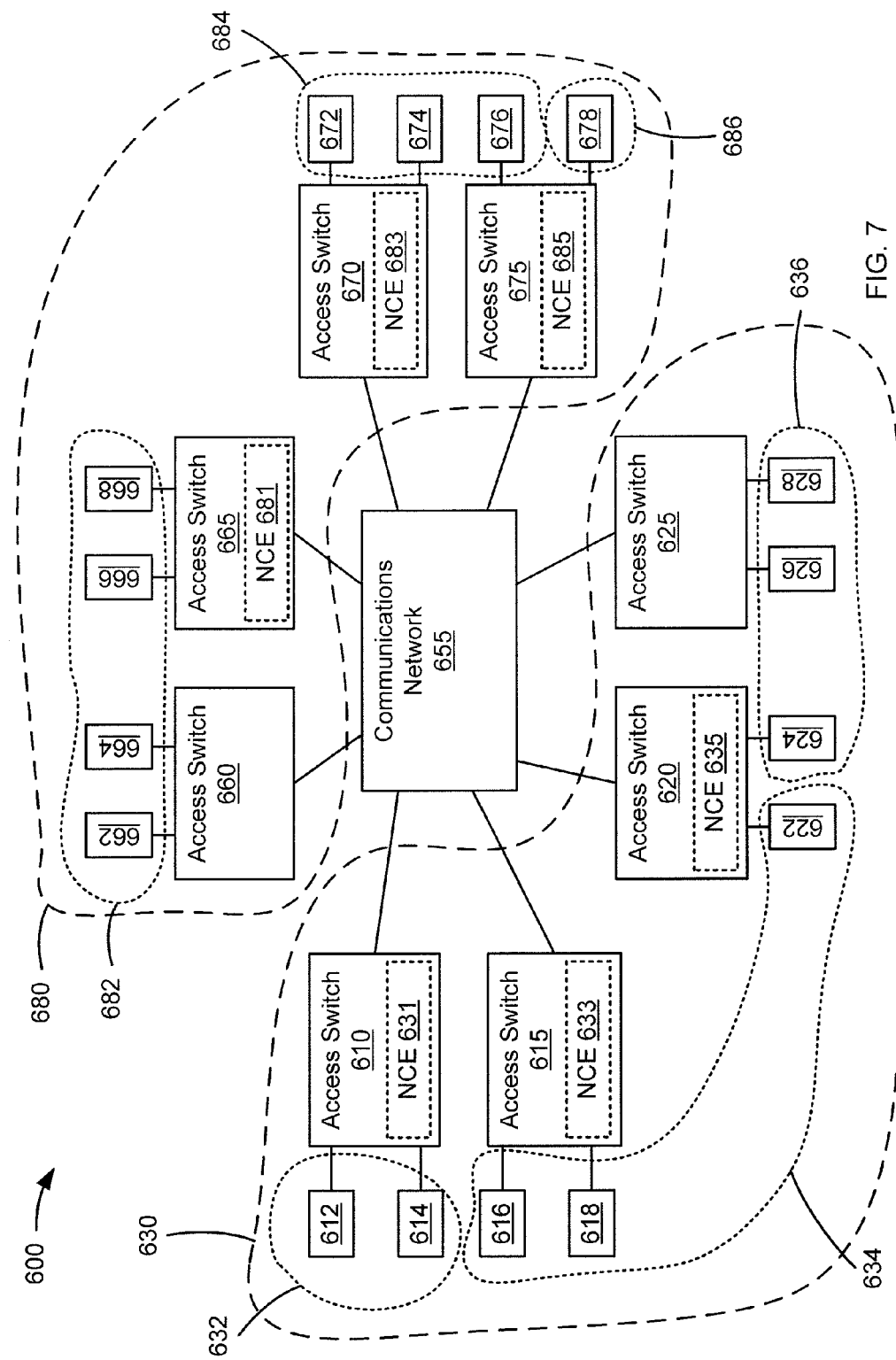
FIG. 7 is a schematic illustrations of a switch fabric system, according to another embodiment.

FIG. 7 is a schematic illustrations of a switch fabric system 600, according to another embodiment. The switch fabric system 600 includes a communications network 655, access switches 610, 615, 620, 625, 660, 665, 670, 675, ports 612, 164, 616, 618, 622, 624, 626, 628, 662, 664, 666, 668, 672, 674, 676, 678 and network control entities 631, 633, 635, 681, 683, 685. The communications network 655, access switches 610, 615, 620, 625, 660, 665, 670, 675, ports 612, 164, 616, 618, 622, 624, 626, 628, 662, 664, 666, 668, 672, 674, 676, 678 and network control entities 631, 633, 635, 681, 683, 685 are substantially similar to the communications network 110, the access switches 120, 130, 140, the ports 131-124, 131-134, 141-144 and the network control entities 171-173, respectively. Accordingly, each network control entity 631, 633, 635, 681, 683, 685 manages a group of ports 632, 634, 636, 682, 684, 686. Specifically, network control entity 631 manages the group of ports 632, network control entity 633 manages the group of ports 634, network control entity 635 manages the group of ports 636, network control entity 681 manages the group of ports 682, network control entity 683 manages the group of ports 684 and network control entity 685 manages the group of ports 686.

Additionally, each network control entity (and its associated ports) is associated with a network segment 630, 680 (e.g., a virtual switch fabric). More specifically, network control entity 631, network control entity 633, and network control entity 635 are associated with the network segment 630, and network control entity 681, network control entity 683, and network control entity 685 are associated with the network segment 680.

Figure 8:
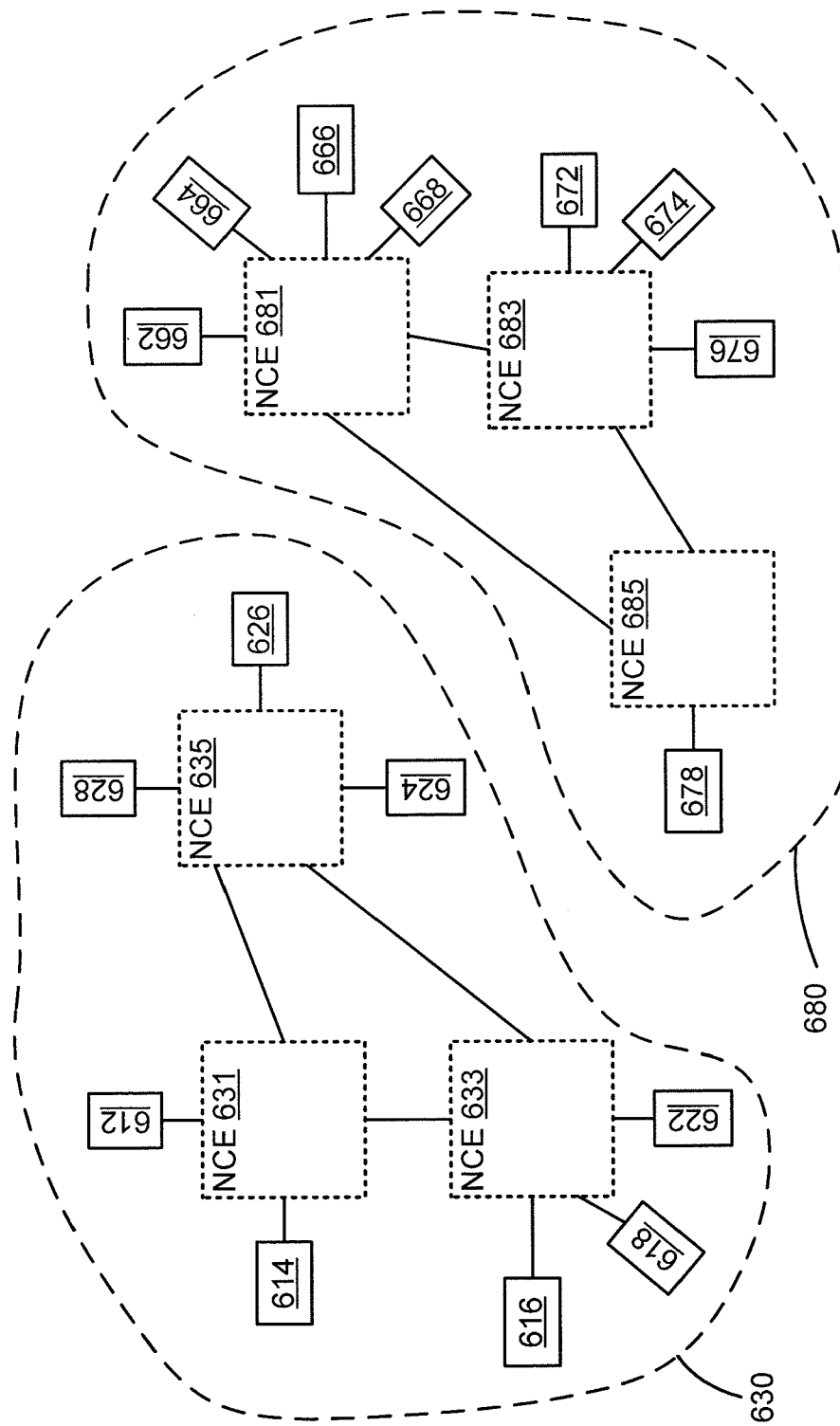
FIG. 8 is a logical representation of a control plane of the switch fabric system of FIG. 7.

FIG. 8 is a logical representation of a control plane of the switch fabric system 600 of FIG. 7. As shown in FIG. 8, the network control entities 631, 633, 635 associated with the network segment 630 can send forwarding-state information (e.g., port identifiers, network segment identifiers, peripheral processing device identifiers, etc.) to the other network control entities 631, 633, 635 associated with the network segment 630, and the network control entities 681, 683, 685 associated with the network segment 680 can send forwarding-state information to the other network control entities 681, 683, 685 associated with the network segment 680. The network control entities 631, 633, 635 associated with the network segment 630, however, do not send forwarding-state information to the network control entities 681, 683, 685 associated with the network segment 680. Accordingly, while the network control entities 631, 633, 635 of the network segment 630 are physically coupled to the network control entities 681, 683, 685 of the network segment 680 by the communications network 655, they are not logically coupled as they are associated with different network segments 630, 680.

In some embodiments, each network control entity 631, 633, 635 associated with the network segment 630 can store an identifier and/or address associated with the other network control entities 631, 633, 635 of the network segment 630. Using the identifiers and/or addresses, each network control entity 631, 633, 635 can send forwarding-state information directly to the other network control entities 631, 633, 635 of the network segment 630 using a targeted protocol (e.g., an application layer protocol), such as, for example, BGP. In such embodiments, the network control entities 631, 633, 635 of the network segment 630 do not send the forwarding-state information to the network control entities 681, 683, 685 of the network segment 680. Similarly, in such embodiments, the network control entities 681, 683, 685 of the network segment 680 can send forwarding-state information to the other network control entities 681, 683, 685 of the network segment 680 using a targeted protocol, such as, for example, BGP, without sending forwarding-state information to the network control entities 631, 633, 635 associated with the network segment 630.

In other embodiments, the enforcement of network segment separation can be performed by the recipient rather than the sender. For example, the network control entities 631, 633, 635 associated with the network segment 630 can send forwarding-state information to the network control entities 681, 683, 685 associated with the network segment 680. In such embodiments, the network control entities 681, 683, 685 discard the forwarding-state information received from the network control entities 631, 633, 635 associated with the network segment 630. More specifically, the forwarding-state information can include and/or be sent with a network segment identifier identifying the network segment with which the forwarding-state is associated. For example, if the forwarding-state information originates from the network control entity 631, the forwarding-state information can include and/or be sent with an identifier of the network segment 630. As such, if a network control entity 681, 683, 685 associated with the network segment 680 receives the forwarding-state information having and/or being sent with the identifier of the network segment 630, the network control entity 681, 683, 685 can discard the forwarding-state information as being associated with a different network segment.

While not shown in FIGS. 6 and 7, in other embodiments the switch fabric system 600 can include a one or more network control entities functioning as route reflectors. In some embodiments, for example, each network segment 630, 680 can include a route reflector. In such embodiments, the network control entities 631, 635, and 633 can be operatively coupled to each other via a first route reflector and the network control entities 681, 683 and 685 can be coupled to each other via a second route reflector. As discussed above, such route reflectors can be implemented at and/or hosted by compute devices and/or access switches.

While various embodiments have been described above, it should be understood that they have been presented by way of example only, and not limitation. Where methods described above indicate certain events occurring in certain order, the ordering of certain events may be modified. Additionally, certain of the events may be performed concurrently in a parallel process when possible, as well as performed sequentially as described above.

Embodiments shown and described above refer to multiple peripheral processing devices, including compute notes, storage nodes, service nodes and routers. In some embodiments, one or more of the compute nodes can be general-purpose computational engines that can include, for example, processors, memory, and/or one or more network interface devices (e.g., a network interface card (NIC)). In some embodiments, the processors within a compute node can be part of one or more cache coherent domains. In some embodiments, the compute nodes can be host devices, servers, and/or so forth. In some embodiments, one or more of the compute nodes can have virtualized resources such that any compute node (or a portion thereof) can be substituted for any other compute node (or a portion thereof) operatively coupled to a switch fabric system.

In some embodiments, one or more of the storage nodes can be devices that include, for example, processors, memory, locally-attached disk storage, and/or one or more network interface devices. In some embodiments, the storage nodes can have specialized modules (e.g., hardware modules and/or software modules) configured to enable, for example, one or more of the compute nodes to read data from and/or write data to one or more of the storage nodes via a switch fabric. In some embodiments, one or more of the storage nodes can have virtualized resources so that any storage node (or a portion thereof) can be substituted for any other storage node (or a portion thereof) operatively coupled to a switch fabric system.

In some embodiments, one or more of the services nodes can be an open systems interconnection (OSI) layer-4 through layer-7 device that can include, for example, processors (e.g., network processors), memory, and/or one or more network interface devices (e.g., 10 Gb Ethernet devices). In some embodiments, the services nodes can include hardware and/or software configured to perform computations on relatively heavy network workloads. In some embodiments, the services nodes can be configured to perform computations on a per packet basis in a relatively efficient fashion (e.g., more efficiently than can be performed at, for example, a compute node). The computations can include, for example, stateful firewall computations, intrusion detection and prevention (IDP) computations, extensible markup language (XML) acceleration computations, transmission control protocol (TCP) termination computations, and/or application-level load-balancing computations. In some embodiments, one or more of the services nodes can have virtualized resources so that any service node (or a portion thereof) can be substituted for any other service node (or a portion thereof) operatively coupled to a switch fabric system.

In some embodiments, one or more of the routers can be networking devices configured to connect at least a portion of a switch fabric system (e.g., a data center) to another network (e.g., the global Internet). In some embodiments, for example, a router can enable communication between components (e.g., peripheral processing devices, portions of the switch fabric) associated with a switch fabric system. The communication can be defined based on, for example, a layer-3 routing protocol. In some embodiments, one or more of the routers can have one or more network interface devices (e.g., 10 Gb Ethernet devices) through which the routers can send signals to and/or receive signals from, for example, a switch fabric and/or other peripheral processing devices.

Some embodiments described herein relate to a computer storage product with a non-transitory computer-readable medium (also can be referred to as a non-transitory processor-readable medium) having instructions or computer code thereon for performing various computer-implemented operations. The computer-readable medium (or processor-readable medium) is non-transitory in the sense that it does not include transitory propagating signals per se (e.g., a propagating electromagnetic wave carrying information on a transmission medium such as space or a cable). The media and computer code (also can be referred to as code) may be those designed and constructed for the specific purpose or purposes. Examples of non-transitory computer-readable media include, but are not limited to: magnetic storage media such as hard disks, floppy disks, and magnetic tape; optical storage media such as Compact Disc/Digital Video Discs (CD/DVDs), Compact Disc-Read Only Memories (CD-ROMs), and holographic devices; magneto-optical storage media such as optical disks; carrier wave signal processing modules; and hardware devices that are specially configured to store and execute program code, such as Application-Specific Integrated Circuits (ASICs), Programmable Logic Devices (PLDs), Read-Only Memory (ROM) and Random-Access Memory (RAM) devices.

Examples of computer code include, but are not limited to, micro-code or micro-instructions, machine instructions, such as produced by a compiler, code used to produce a web service, and files containing higher-level instructions that are executed by a computer using an interpreter. For example, embodiments may be implemented using Java, C++, or other programming languages (e.g., object-oriented programming languages) and development tools. Additional examples of computer code include, but are not limited to, control signals, encrypted code, and compressed code.

While various embodiments have been described above, it should be understood that they have been presented by way of example only, not limitation, and various changes in form and details may be made. Any portion of the apparatus and/or methods described herein may be combined in any combination, except mutually exclusive combinations. The embodiments described herein can include various combinations and/or sub-combinations of the functions, components and/or features of the different embodiments described.

What is claimed is:

1. A system, comprising:
a first network control entity associated with a first network segment, the first network segment including at least a portion of a plurality of data ports at a first network element operatively coupled to a data plane of a switch fabric;
a second network control entity associated with the first network segment, the first network segment including at least a portion of a plurality of data ports at a second network element operatively coupled to the data plane of the switch fabric, the second network element being different from the first network element; and
a third network control entity associated with a second network segment, the second network segment including at least a portion of a plurality of data ports at a third network element operatively coupled to the data plane of the switch fabric, the third network element being different from the first network element and the second network element,
the first network control entity to send to the second network control entity an identifier of the first network segment and forwarding-state information associated with a data port from the portion of the plurality of data ports at the first network element,
the second network control entity to receive the identifier of the first network segment and the forwarding-state information, the second network control entity to store the forwarding-state information at a memory associated with the second network control entity, the second network control entity to send a control signal to the second network element in response to the forwarding-state information,
the first network control entity to not send to the third network control entity the identifier of the first network segment and the forwarding-state information based on the identifier of the first network segment and an identifier of the second network segment.

2. The system of claim 1, further comprising a distributed network switch, the first network element, the second network element and the third network element are included within the distributed network switch; and
the first network control entity to send the identifier of the first network segment and the forwarding-state information using a Border Gateway Protocol.

3. The system of claim 1, further comprising:
a fourth network control entity to communicate with the first network control entity, the second network control entity and the third network control entity;
the fourth network control entity to receive the identifier of the first network segment and the forwarding-state information from the first network control entity; and
the fourth network control entity to send the identifier of the first network segment and the forwarding-state information to the second network control entity, the fourth network control entity to not send the identifier of the first network segment and the forwarding-state information to the third network control entity.

4. The system of claim 1, further comprising:
a fourth network control entity to communicate with the first network control entity, the second network control entity and the third network control entity such that the first network control entity is to communicate with the second network control entity and the third network control entity via the fourth network control entity;
the first network control entity to send the identifier of the first network segment and the forwarding-state information using a Border Gateway Protocol; and
the fourth network control entity being a Route Reflector of the Border Gateway Protocol.

5. The system of claim 1, wherein:
the first network control entity to be hosted at the first network element;
the second network control entity to be hosted at the second network element; and
the third network control entity to be hosted at the third network element.

6. The system of claim 1, wherein the first network control entity is hosted at the first network element and the second network control entity is hosted at the second network element, the system further comprising:
a compute device to communicate with the first network element, the second network element and the third network element, the third network control entity being hosted at the compute device.

7. The system of claim 1, further comprising a compute device to communicate with the first network element, the second network element and the third network element, the first network control entity being hosted at the compute device, the second network control entity to be hosted at the compute device, and the third network control entity to be hosted at the compute device.

8. The system of claim 1, wherein the forwarding-state information includes at least a port identifier of a data port from the portion of the plurality of data ports at the first network element and an identifier of a peripheral processing device operatively coupled to the data port.

9. The system of claim 1, wherein:
the first network element is included within a first chassis of a distributed network switch; and
the second network element is included within a second chassis of the distributed network switch.

10. A system, comprising:
a first plurality of network control entities, each network control entity from the first plurality of network control entities associated with a first network segment of a distributed network switch, each network control entity from the first plurality of network control entities uniquely associated with a set of data ports from a first plurality of data ports of the distributed network switch;
a second plurality of network control entities, each network control entity from the second plurality of network control entities associated with a second network segment of the distributed network switch, each network control entity from the second plurality of network control entities uniquely associated with a set of data ports from a second plurality of data ports of the distributed network switch; and
a network control entity from the first plurality of network control entities to detect a forwarding state at the set of data ports from the first plurality of data ports uniquely associated with the network control entity,
the network control entity to send an identifier of the first network segment and information associated with the forwarding state to each remaining network control entity from the first plurality of network control entities,
the network control entity to not send the identifier of the first network segment and the information associated with the forwarding state to the second plurality of network control entities.

11. The system of claim 10, wherein:
the first plurality of network elements and the second plurality of network elements are included within the distributed network switch; and
the network control entity to send the identifier of the first network segment and the information associated with the forwarding state using a Border Gateway Protocol.

12. The system of claim 10, wherein the network control entity is a first network control entity, the system further comprising:
a second network control entity from the first plurality of network control entities to communicate with the first network control entity;
the first network element to send the identifier of the first network segment and the information associated with the forwarding state using a Border Gateway Protocol to the second network control entity; and
the second network control entity being a Route Reflector of the Border Gateway Protocol and to send the identifier of the first network segment and the information associated with the forwarding state to the first plurality of network entities.

13. The system of claim 10, wherein the information associated with the forwarding state includes at least a port identifier of a data port from the first plurality of data ports and uniquely associated with the network control entity and an identifier of a peripheral processing device operatively coupled to the data port.

14. The system of claim 10, wherein the information associated with the forwarding state includes at least a MAC address associated with a peripheral processing device operatively coupled to a data port from the first plurality of data ports and uniquely associated with the network control entity.

15. The system of claim 10, further comprising a compute device to communicate with the distributed network switch, the compute device to host at least one network control entity from the first plurality of network control entities and at least one network control entity from the second plurality of network control entities.

16. A system, comprising:
a first network control entity associated with a first network segment and at least a portion of a plurality of data ports at a first network element;
a second network control entity associated with the first network segment and at least a portion of a plurality of data ports at a second network element, the second network element being different from the first network element; and
a third network control entity associated with a second network segment and at least a portion of a plurality of data ports at a third network element, the third network element being different from the first network element and the second network element,
the first network control entity to send an identifier of the first network segment and forwarding-state information associated with a data port from the portion of the plurality of data ports at the first network element,
the second network control entity to receive the identifier of the first network segment and the forwarding-state information, the second network control entity to store the forwarding-state information at a memory associated with the second network control entity, the second network control entity to send a control signal to the second network element in response to the forwarding-state information,
the third network control entity to receive the identifier of the first network segment and the forwarding-state information, the third network control entity to discard the forwarding-state information based on the identifier of the first network segment.

17. The system of claim 16, further comprising:
a fourth network control entity to communicate with the first network control entity, the second network control entity and the third network control entity such that the first network control entity is to communicate with the second network control entity and the third network control entity via the fourth network control entity,
the first network element to send the identifier of the first network segment and the forwarding-state information using a Border Gateway Protocol,
the fourth network control entity being a Route Reflector of the Border Gateway Protocol.

18. The system of claim 16, wherein the forwarding-state information includes at least a port identifier of a data port from the portion of the plurality of data ports at the first network element and an identifier of a peripheral processing device operatively coupled to the data port.

19. The system of claim 16, wherein the forwarding-state information includes at least one of a MAC address or an IP address associated with a peripheral processing device operatively coupled to a data port from the portion of the plurality of data ports at the first network element.

20. The system of claim 16, wherein the first network control entity is hosted at the first network element, the second network control entity is hosted at the second network element, the system further comprising:
a compute device to communicate with the first network element, the second network element and the third network element, the third network control entity being hosted at the compute device.

* * * * *